United States Patent [19]

Baggaley

[11] 3,865,126

[45] Feb. 11, 1975

[54] LIQUID METERING APPARATUS

[76] Inventor: Thomas H. Baggaley, 34 Rothschild St., London, England S.E.27

[22] Filed: Nov. 26, 1973

[21] Appl. No.: 418,985

[30] Foreign Application Priority Data
Dec. 7, 1972  Great Britain .................... 56433/72

[52] U.S. Cl. .............................. 137/101.21, 137/99
[51] Int. Cl. ......................................... G05d 11/00
[58] Field of Search .......... 137/98, 99, 99.5, 101.21

[56] References Cited
UNITED STATES PATENTS
2,238,747  4/1941  Ornstein ............................... 137/99
3,010,404  11/1961  Anderson .......................... 137/99 X
3,621,865  11/1971  Baggaley ....................... 137/101.21

Primary Examiner—William R. Cline
Attorney, Agent, or Firm—Brisebois & Kruger

[57] ABSTRACT

A system for supplying a liquid additive to a flow of liquid under pressure in a pipe uses a pump which is operated by the pressure of the liquid. The pump has two interconnected diaphragms which are both acted on by the liquid which is admitted by solenoid controlled valves and only one of the diaphragms serves to pump the additive. The pump thus pumps the additive at a greater pressure than that of the liquid in the pipe and hence enables the additive to be pumped into the liquid flowing in the pipe. The system preferably includes a rotary flow meter in the pipe which controls the solenoid valves of the pump to meter the proportion of additive pumped into the liquid accurately in dependence on the rate of flow of liquid through the pipe.

5 Claims, 2 Drawing Figures

LIQUID METERING APPARATUS

This invention relates to systems for supplying a liquid additive to a flow of liquid under pressure in a pipe by the use of a pump which is operated by the pressure of the liquid flowing through the pipe.

The additive has to be pumped at a pressure sufficient to enable it to overcome the pressure of the liquid in the pipe and to overcome the inevitable losses which occur in the pump and in the passages through which the additive flows. It is a major problem with such systems, therefore to arrange for the additive to be pumped at a pressure which is sufficiently greater than that of the liquid which operates the pump.

One system which overcomes this problem is described in my earlier U.S. Pat. No. 3,621,865 and this system includes a liquid operated piston pump which has a pair of interconnected pistons of different diameters operating in correspondingly sized cylinders. The piston of smaller diameter acts on the additive whilst the piston of larger diameter is acted upon by the operating liquid. The difference in areas of the two pistons produces the necessary step up in the pressure of the additive above that of the operating liquid.

This system has been found to operate well provided that the operating liquid is clean, but one of the principle uses of this system is in horticulture to introduce quantities of liquid fertilizer into irrigation water. The water frequently contains suspended solids, for example, fine sand or silt particles which cause rapid wear between the larger piston and its cylinder so that the pump soon ceases to operate properly.

It is an object of this invention to overcome both these problems and so provide a system which may be used with a dirty operating liquid for long periods without maintenance. According to this invention a system for supplying a liquid additive to a flow of liquid under pressure comprises a pipe for the flow of liquid under pressure, a diaphragm pump including a first diaphragm, one face of which forms part of a wall of a pumping chamber having an inlet with a non-return valve leading to an additive supply passage and an outlet with a non-return valve leading to the pipe, and the other face of which forms part of a wall of a primary operating chamber, and the second diaphragm which is mechanically connected to the first diaphragm, one face of the second diaphragm forming part of a wall of a secondary operating chamber and the other face of the second diaphragm being arranged to be subject to ambient pressure, the two operating chambers having solenoid valve-controlled inlets connected to the pipe and solenoid valve-controlled venting outlets, and the system further comprising a control device for operating the solenoid valve or valves to cause pulses or liquid under pressure to be admitted simultaneously from the pipe to both operating chambers and then to be vented to cause the diaphragms to deflect and return in unison so that the additive is pumped through the pumping chamber and the pressure of the liquid acting on the one face of the second diaphragm, while the other face is subjected to ambient pressure, increases the total force acting on the first diaphragm to enable the additive to be pumped into the pipe against the pressure of the liquid.

The return stroke of the diaphragms may be brought about in various ways. Thus the other face of the second diaphragm may form part of the wall of a still further operating chamber which is arranged so that the liquid under pressure from the pipe is admitted from the pipe to cause the diaphragms to return when the liquid in the primary and secondary operating chambers is vented, this further operating chamber being vented to atmosphere during the pumping strokes so that no adverse back pressure is produced. Preferably however the other face of the second diaphragm is permanently exposed to atmospheric pressure and in this case the return stroke may be brought about by the elasticity of the diaphragms alone. Preferably, though it is assisted by a return spring or springs.

The control device for operating the solenoid valve or valves may include a rotary flow meter which is arranged to measure the flow through, and is connected in series with, the pipe, and a change-over switch which is arranged to be operated by the flow meter and to operate the solenoid operated valve or valves in dependence on the rate of flow of liquid through the pipe.

The solenoid valve-controlled inlet and outlet of the operating chambers may be controlled by a single, three-way solenoid valve or each chamber may have a separate solenoid valve controlling its inlet and a further valve controlling its outlet. Preferably however the primary and secondary operating chambers are directly interconnected by a further pipe and a single solenoid valve then controls the inlet to both operating chambers and another solenoid valve controls the outlet from both chambers.

Preferably, as is usual in diaphragm pumps, both diaphragms have their edges clamped between the edges of saucer-shaped plates, the saucer-shaped plates being arranged in pairs with their concave faces toward one another, the spaces bounded by the diaphragms and the saucer-shaped plates forming the chambers. Preferably the two diaphragms are arranged co-axially, that is to say lines perpendicular to the diaphragms and passing through their centres are aligned with each other, and they are preferably directly mechanically connected to each other by a rod having one end fixed to the centre of the first diaphragm and the other end fixed to the centre of the second diaphragm.

An example of a system in accordance with the invention will now be described with reference to the accompanying drawings in which.

Figure 1:
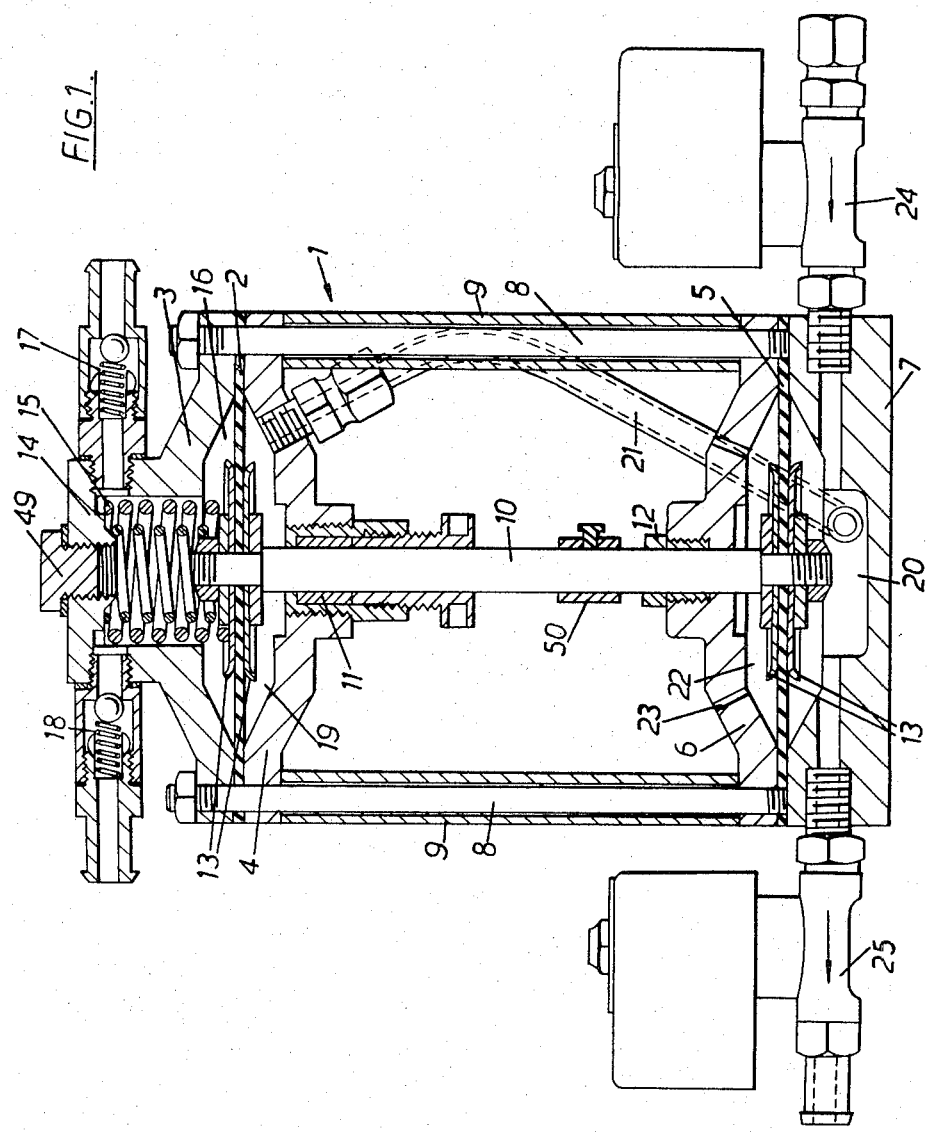
FIG. 1 is a diametric section through a pump forming part of the system.

A pump 1 comprises a first diaphragm 2 which is clamped between saucer-shaped plates 3 and 4. A second diaphragm 5 is clamped between a further saucer-shaped plate 6 and a base plate 7 having a saucer-shaped depression in one face, the other face of the plate being flat. The saucer-shaped plates 3 and 4 and the plate 6 and the base plate 7 are clamped together, with their respective diaphragms 2 and 5 between them, by common studs 8, and the two pairs of plates are separated by spacer tubes 9. The pump is mounted in an upright position resting on the flat lower face of the base plate 7.

The diaphragms 2 and 5 are, in this example, made from Neoprene (Registered Trade Mark) reinforced with nylon. The diaphragms 2 and 5 are directly connected to each other by a push rod 10 which is provided with a gland 11 where it passes through the plate 4 and a guide 12 where it passes through the plate 6.

The upper end of the rod 10 is fixed to the diaphragm 2 through stiffening discs 13 and the lower end of the rod 10 is fixed to the diaphragm 5 by further discs 13. A compression spring 14 is surrounded by a second compression spring 15 and both springs are arranged and act between the upper stiffening disc 13 and an upper part of the plate 3. These springs form a return spring assembly and bias the diaphragms 2 and 5 and the push rod 10 into their lowermost positions.

The space between the diaphragm 2 and the plate 3 forms a pumping chamber 16 having an inlet with an inlet non-return valve 17 and an outlet with an outlet non-return valve 18. The space between the underside of the diaphragm 2 and the plate 4 forms a primary operating chamber 19. A secondary operating chamber 20 is bounded by the underside of the diaphragm 5 and the saucer-shaped depression in the base plate 7. The two operating chambers 19 and 20 communicate directly with each other through a pipe 21. A further chamber 22 is formed between the upper face of the diaphragm 5 and the plate 6. This space is permanently vented to the atmosphere through an opening 23. The chamber 20 has an inlet duct provided with a solenoid valve 24 and an outlet duct provided with a solenoid valve 25.

Figure 2:
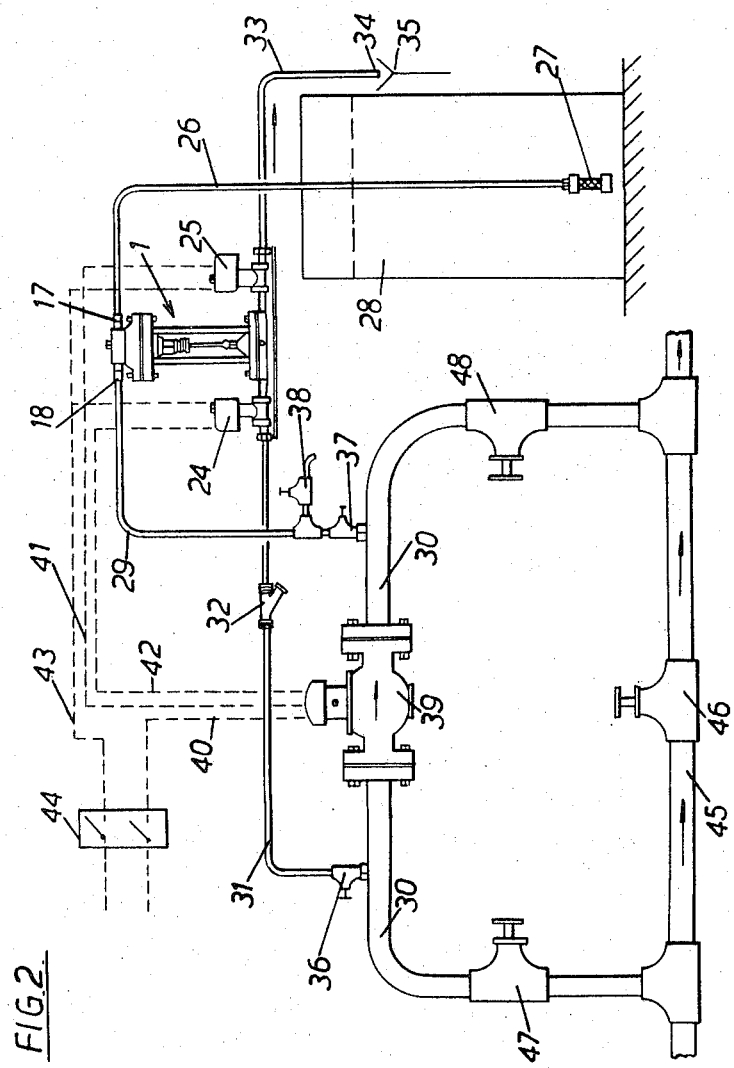
FIG. 2 is a diagram of the liquid and electrical circuits of the system.

The pump is connected in the system as shown in FIG. 2 of the drawings. The inlet valve 17 of the pumping chamber 16 is connected to an additive supply tube 26. A strainer 27 is provided at the end of the additive supply tube 26 and is held away from the bottom of an additive stock reservoir 28. A duct 29 is connected between the outlet valve 18 of the pumping chamber 16 and a pipe 30. A first conduit 31 including an in-line strainer 32 joins the inlet solenoid valve 24 to the pipe 30 upstream of its junction with the duct 29. A second conduit 33 is connected to the outlet solenoid valve 25 and leads to a vent outlet 34 positioned over a drain 35. The first conduit 31 also includes a stop valve 36 and the duct 29 also includes a stop valve 37 and a test cock 38.

A flow meter 39 of a conventional type is connected in the pipe 30 and includes a rotary impeller which, in use, rotates at a speed proportional to the flow of water through the pipe 30 and which is connected through a gear train to a rotary cam. A cam follower, bearing on the cam, operates a two position, change-over microswitch which connects a common electrical lead 40 to a lead 41, connected to the outlet solenoid valve 25, or to a lead 42, connected to the inlet solenoid valve 24. Both solenoid valves are connected to a common return lead 43. The leads 40 and 43 are connected to a power supply by a double-pole switch 44. The pipe 30 is equipped with a by-pass loop 45 including a stop valve 46, and the pipe 30 also includes a pair of isolating valves 47 and 48 to isolate the flow meter and the liquid additive system and allow all the liquid flow to take place through the by-pass loop 45 if and when this is required.

The additive supply system in this example is used to supply liquid fertilizer from the additive stock reservoir 28 in metered quantities into irrigation water flowing under pressure through the pipe 30. To bring the system into operation, the stop valve 46 in the by-pass 45 is closed; the isolating valves 47 and 48 in the pipe 30 are opened to direct the flow of irrigation water through the pipe 30 and the stop valve 37 is opened. This flow of irrigation water causes the impeller in the flow meter 39 to rotate and rotate its associated cam. The electrical power supply is connected to the microswitch by closing the switch 44 and as the impeller rotates it causes the cam to open and close the contacts of the microswitch which in turn causes the solenoid valves 24 and 25 to open and close alternately. The stop valve 36 is opened so that the irrigation water is fed along the first conduit 31, through the in-line strainer 32, to remove any large suspended solids that might clog the solenoid valves 24 and 25, and to the inlet solenoid valve 24. When the microswitch causes the inlet valve 24 to open it causes the outlet valve 25 to close and the water is fed into the secondary operating chamber 20 and along the pipe 21 into the primary chamber 19. The pressure of the water in the chambers 19 and 20 causes the diaphragms 2 and 5 to move upwards against the return springs until the discs 13 on the top of the diaphragms 2 and 5 engage the plates 3 and 6. As the cam rotates further the microswitch causes the inlet solenoid valve 24 to close and the outlet valve 25 to open. The return springs 14 and 15 then push the diaphragms 2 and 5 downwards until the discs 13 beneath the diaphragms 2 and 5 engage the plates 4 and 7. The water passes out through the outlet valve 25 along the second conduit 33 and out of the vent outlet 34 into the drain 35. As the cam rotates still further the microswitch again closes the outlet valve 25 and opens the inlet valve 24 to admit more water into the operating chambers 19 and 20 to repeat the cycle.

The up and down movement of the diaphragms 2 and 5 causes the liquid fertilizer from the reservoir 28 to be sucked through the strainer 27, along the additive supply tube 26, through the inlet valve 17 and the pumping chamber 16 and out of the output valve 18. The liquid fertilizer then passes along the ducts 29 and into the pipe 30. The pressure of the irrigation water acting in the chambers 19 and 20 on both diaphragms 2 and 5 causes the liquid fertilizer in the pumping chamber 16 to be subjected to a pressure nearly double that of the irrigation water. The stop valve 37 and the test cock 38 are provided so that the operation of the pump can be checked by allowing the liquid fertilizer to flow out of the test cock 38 instead of into the pipe 30.

The pumping chamber 16 is provided with a priming plug 49 to enable all the air to be removed from the pumping chamber 16 before the pump is started. The movement of the rod 10 and the diaphragms 2 and 5 is positively limited at each end of each stroke and therefore the swept volume of the pumping chamber is a constant for each stroke of the pump. Once all the air has been expelled from the pumping chamber 16 a constant volume of fertilizer will be added to the irrigation water flowing through the pipe each time the pump operates. As the operation of the solenoid valves 24 and 25 is governed by, and is in direct proportion to, the rate of flow of irrigation water through the pipe, the fertilizer is added to the irrigation water in a strict proportional ratio.

An adjustable collar 50 is mounted on the push rod 10 and can form a stop to limit the return stroke of the rod 10 by the collar coming into contact with the upper surface of the guide 12. This will, in use, prevent the diaphragms 2 and 5 from returning to their lowermost positions in which the lower discs 13 engage the plates 4 and 7 and hence it will reduce the amount of fertilizer drawn into the pumping chamber 16 upon the return stroke of the pump. The rate of addition of fertilizer into the irrigation water upon each stroke of the pump 1 may thus be varied. Another way in which the rate of addition of the fertilizer can be varied is either, by altering the gearing in between the impeller and the cam, or by having more than one operating portion on the cam so that for each revolution of the cam, the microswitch is operated more than once.

Preferably all the internal parts of the pump which are likely to come into contact with the liquid fertilizer are made from stainless steel whilst the remaining parts of the pump are preferably made from brass which has been nickel plated where it is likely to come into contact with the irrigation water. The first and second conduits 31 and 33, the duct 29 and the additive supply tube 26 are preferably made from high pressure nylon tube but they may, of course, be made from another material, for example, metal.

I claim:

1. A system for supplying a liquid additive to a flow of liquid under pressure, such system comprising:
   1. a pipe for carrying the flow of liquid under pressure;
   2. a diaphragm pump including a first diaphragm having first and second faces, a pumping chamber bounded partly by said first face of said first diaphragm, a primary operating chamber bounded partly by said second face of said first diaphragm, a second diaphragm having first and second faces, a secondary operating chamber bounded partly by said first face of said second diaphragm, means for subjecting said second face of said second diaphragm to ambient pressure, and means connecting said first and said second diaphragms for movement thereof in unison;
   3. means for communicating said pumping chamber with a supply of liquid additive, and first check valve means for preventing flow from said pumping chamber to said supply;
   4. means communicating said pipe and said pumping chamber, and second a check valve means preventing flow from said pipe to said pumping chambers;
   5. means communicating said first and said second operating chambers with said pipe, means for venting said first and said second operating chambers, solenoid valve means for controlling said pipe communicating means and said venting means of said first and second operating chambers, and a control device for operating said solenoid valve means cyclically whereby liquid under pressure is admitted from said pipe to said first and said second operating chambers when said venting means is closed and when said second face of said second diaphragm is subjected to ambient pressure, the force exerted on the said second diaphragm by said liquid under pressure in said second operating chamber combined with the force exerted on said first diaphragm by said liquid under pressure in said first operating chamber causing said diaphragms to move to pump additive in said pumping chamber into said pipe against the pressure of the liquid in said pipe, and means communicating said pipe to said first and said second operating chambers is then closed and said venting means opened to allow fresh additive to fill said pumping chamber;
   6. and means for causing said diaphragms to move when said venting means opens whereby fresh additive is drawn into said pumping chamber.

2. The system of claim 1 wherein said control device comprises a rotary flow meter arranged in series with said pipe, a change-over switch, means operatively connecting said flow meter to said change-over switch, and electrical connecting means operatively connecting said changeover switch and said solenoid valve means whereby said solenoid valve means are operated cyclically in dependence on the rate of flow of said liquid through said pipe.

3. The system of claim 1 wherein said means for subjecting said second face of said second diaphragm to ambient pressure permanently exposes said second face to ambient pressure, and wherein said means communicating said first and second operating chambers with said pipe, said means for venting said first and second operating chambers and said solenoid valve means for controlling said pipe communicating means and said venting means comprise a first pipe means communicating said first and said second operating chambers, a second means communicating said second operating chamber and said pipe, a first solenoid valve controlling said second means, venting means communicating with said second operating chamber, and a second solenoid valve controlling said venting means, whereby said first solenoid valve is opened to admit liquid under pressure from said pipe into said second operating chamber and along said first pipe means to said first operating chamber when said second solenoid valve is closed, and then as said control device operates cyclically said first solenoid valve closes and said second solenoid valve opens to vent liquid from said operating chamber and through said first pipe means from said first operating chamber.

4. The system of claim 1 wherein said diaphragm pump further includes a first, a second, a third, and a fourth saucer-shaped plate, said first and said second plates being clamped together with their concave faces toward one another with said first diaphragm between them, said third and said fourth plates being clamped together with their concave faces toward one another and with said second diaphragm between them, said first plate together with said first face of said first diaphragm bounding said pumping chamber, said second plate together with said second face of said first diaphragm bounding said primary operating chamber, said third plate including a vent and together with said first face of said second diaphragm bounding a space which is permanently vented to ambient pressure, said fourth plate together with said second face of said second diaphragm bounding said second operating chamber, and means mounting said first and said second plate and said third and said fourth plate coaxially; and wherein said means connecting said first and said second diaphragms is a rigid rod having one end fixed to the centre of said first diaphragm and the other end fixed to the centre of said second diaphragm, said rod passing through said second and said third plates.

5. A system for supplying a liquid additive to a flow of liquid under pressure, said system comprising a pipe for containing said flow of liquid under pressure a diaphragm pump including a first diaphragm and a second diaphragm, means including one side of said first diaphragm bounding a pumping chamber, an inlet in communication with said pumping chamber, a non-return valve in said inlet, an outlet in communication with said pumping chamber, a non-return valve in said outlet, means including the other side of said first diaphragm bounding a primary operating chamber, a first passage communicating with said primary operating chamber, means including one side of said second diaphragm bounding a secondary operating chamber, a second passage communicating with said secondary operating chamber, communicating means for subjecting the other face of said second diaphragm to ambient pressure, and rigid means interconnecting said two diaphragms for movement in unison with each other, said system further comprising solenoid valve means operatively connected to said first and said second passages, means for communicating said inlet of said pumping chamber with an additive supply reservoir, said outlet of said pumping chamber communicating with said pipe, a first conduit communicating said pipe upstream from said outlet of said pumping chamber to said solenoid valve means, a vent outlet in communication with said solenoid valve means, a control device, and electrical connecting means connecting said control device to said solenoid valve means, said control device controlling the operation of said solenoid valve means to cause the admission of said liquid under pressure from said pipe through said first conduit, through said valve means through said first and said second passages into said primary and said secondary operating chambers to cause said first and said second diaphragms to move in unison to pump additive out of said pumping chamber through said outlet and into said flow of liquid in said pipe, said communicating means subjecting said outer face of said second diaphragm to ambient pressure whilst said additive is being pumped into said pipe, said control device subsequently controlling the operation of said valve means to cause the discharge of said liquid from said primary and said secondary operating chambers, through said first and said second passages through said valve means, and from said vent outlet to allow said first and said second diaphragms to return in unison to draw additive from said said stock reservoir through said inlet and into said pumping chamber under the influence of a return bias means.

* * * * *